United States Patent [19]

Kubo et al.

[11] Patent Number: 5,807,654
[45] Date of Patent: Sep. 15, 1998

[54] POLYESTER RESIN FOR TONER, PROCESS FOR ITS PRODUCTION AND TONER

[75] Inventors: Shinji Kubo; Noriyuki Tajiri; Hitoshi Iwasaki; Yoichi Nagai, all of Toyohashi, Japan

[73] Assignee: Mitsubishi Rayon Company Ltd., Tokyo, Japan

[21] Appl. No.: 605,074

[22] PCT Filed: Jul. 12, 1995

[86] PCT No.: PCT/JP95/01395

§ 371 Date: Mar. 12, 1996

§ 102(e) Date: Mar. 12, 1996

[87] PCT Pub. No.: WO96/02870

PCT Pub. Date: Feb. 1, 1996

[30] Foreign Application Priority Data

Jul. 13, 1994 [JP] Japan .................................. 6-183060
Mar. 14, 1995 [JP] Japan .................................. 7-080896

[51] Int. Cl.$^6$ .................................................. G03G 9/087
[52] U.S. Cl. .............................................................. 430/109
[58] Field of Search .................................. 430/106, 109, 430/110

[56] References Cited

U.S. PATENT DOCUMENTS

| | | |
|---|---|---|
| 3,716,575 | 2/1973 | Finch et al. .............................. 260/475 |
| 4,980,448 | 12/1990 | Tajiri et al. . |
| 5,057,596 | 10/1991 | Kubo et al. . |
| 5,153,301 | 10/1992 | Tajiri et al. . |
| 5,292,865 | 3/1994 | Kerpes et al. .......................... 528/492 |
| 5,578,409 | 11/1996 | Kotaki et al. .......................... 430/109 |

*Primary Examiner*—John Goodrow
*Attorney, Agent, or Firm*—Oblon, Spivak, McClelland, Maier & Neustadt, P.C.

[57] ABSTRACT

A polyester resin for toner comprising an acid component containing at least one selected from the group consisting of aromatic dicarboxylic acids and their lower alkyl esters, and an alcohol component containing at least one selected from the group consisting of bisphenol A derivative diols, wherein the content of aldehyde compounds, their decomposition products and by-products in the polyester resin is no more than 200 ppm. Toner polyester resins and toners are obtained which do not generate irritating odors even upon melting and kneading during the toner production or upon heating during the copying process, which provide clear images with no haziness due to reduced light permeability of the copy material, which have a wide range of color tone reproduction, and which provide excellent image precision on copied print.

17 Claims, No Drawings

POLYESTER RESIN FOR TONER, PROCESS FOR ITS PRODUCTION AND TONER

TECHNICAL FIELD

The present invention relates to a polyester resin which is useful as dry toner resin to be used for developing electrostatic charged images or magnetic latent images by electrophotography, electrostatic recording, electrostatic printing, etc., as well as to a process for its production and use. More specifically, the present invention relates to a polyester resin for full color toner which is useful in cases where image clarity and precision are required, as well as a process for its production and toner employing it.

BACKGROUND ART

Methods of obtaining perpetual clear images through electrostatic charge involve developing an electrostatic charged image formed on an electrophotosensitive material or electrostatic recording medium, using toner which has previously been electrostatically charged by friction, and then fixing the image. In the case of magnetic latent images, a latent image on a magnetic drum is developed by toner containing a magnetic substance, and then fixed.

The fixing is accomplished either by direct fusion of a developed toner image onto an electrophotosensitive material or electrostatic recording medium, or by transferring a toner image onto paper or film and then fusing it onto a transfer sheet. The toner fusion is accomplished by contact with a solvent vapor, or by pressure and heat. The heating system may be either a non-contact heating system employing an electrical oven or a contact heating system employing a contact roller, but the latter has been mainly used in recent years due to demand for a faster fixing process.

Toner used in dry developing processes include one-component toner and two-component toner. To prepare a two-component toner, first a resin, coloring agent, charge controller and other necessary additives are melted, kneaded and made into a thorough dispersion which is coarsely and then finely crushed, and sorted into prescribed grain size ranges. A one-component toner is prepared in the same manner, though with addition of magnetic iron powder to each of the components of the above-mentioned two-component toner.

The resin, being the major component of the toner mixture, is responsible for most of the required performance of the toner. Thus, for toner production, toner resins must have good dispersability in the coloring agent during the melting/kneading process and good crushability during the crushing process, and for toner use they require a variety of properties, including satisfactory fixation properties, non-offsetting properties, blocking resistance and electrical qualities.

Publicly known resins used for toner production include epoxy resins, polyester resins, polystyrene resins, methacrylic resins and the like, but contact heat fixation systems primarily use styrene and (meth)acrylic acid ester copolymers. Recently, however, attention has been focused on polyester resins because they allow fixation at even lower temperatures and provide excellent polyvinyl plasticizer resistance for the fixed toner images.

Also, in order to obtain color images, the colors must be produced and fixed by adhering 3- or 4-color toner onto transfer paper during the developing process described above, and then melting and mixing each of the components in the fixing process. It is strongly preferred, as mentioned above, that binder resins for full color toner have good mixability during the fixing process, i.e., good melt flowability. However, using binder resins with satisfactory melt flowability results in the problem of an offsetting phenomenon during the fixing process.

Although this offsetting phenomenon may be prevented by crosslinking the binder resin to induce polymerization, such a measure lowers its melt flowability and thus renders it unsuitable as a binder resin for full color toner. Consequently, in order to prevent offsetting when using full color copiers, silicone oil or the like is applied onto the surface of the fixing roller.

In addition, recent emphasis has been placed not only on image properties but also on environmental factors, and the generation of irritating odors during toner production and during copying has led to a number of problems with operators and at offices. Furthermore, since full color toners are often used for copying to OHP sheets, the problem results that the permeability of the copy material is lowered when the binder resin is colored, and the image is hazy when projecting by OHP. Moreover, coloring of binder resins when using full color toners employing a mixture of the 3 primary colors cyan, magenta and yellow, results in a narrow range of color tone reproduction, and thus lower image precision of the copied print. Thus, under the present circumstances in which even higher image precision is in demand, binder resins are now required which have high performance, i.e., low odor and low coloring.

DISCLOSURE OF THE INVENTION

It is an object of the present invention, having been accomplished under the situation described above, to provide a polyester resin for toner which provides excellent image precision on copied print without generating irritating odors during production or use of the toner, providing clear images with no haziness due to lower permeability of the copy material, and having a wide range of color tone reproduction.

As a result of intensive research aimed at achieving the aforementioned object, the present inventors have completed the present invention upon the finding that such object may be achieved with a polyester resin wherein the content of aldehyde compounds, their decomposition products and their by-products is within a specific numerical limit, In other words, the present invention is a polyester resin for toner which comprises an acid component containing at least one selected from the group consisting of aromatic dicarboxylic acids and their lower alkyl esters, and an alcohol component containing at least one selected from the group consisting of bisphenol A derivative diols, the content of aldehyde compounds, their decomposition products and their by-products in the polyester resin being no more than 200 ppm.

The polyester resin of the invention is useful as a binder resin for dry toner used for the developing of electrostatic charged images or magnetic latent images by electrophotography, electrostatic recording, electrostatic printing, and the like.

BEST MODE FOR CARRYING OUT THE INVENTION

Aldehyde compounds, their decomposition products and their by-products according to the invention are compounds, decomposition products and by-products which have acetaldehyde, propionaldehyde or other aldehyde groups and have boiling points no higher than 180° C.

These aldehyde compounds, decomposition products and by-products are produced by heat-induced decomposition of bisphenol A derivative components used in toner polyester resins, or by reductive reaction of carboxylic acids which is essential for polyesters. The aldehyde compounds, decomposition products and by-products can result through a variety of processes for polyester resin-based toner. The aldehyde compounds and their decomposition products can also yield dioxalane compounds by reaction with starting materials for polyesters, such as ethylene glycol.

These aldehyde compounds, their decomposition products and by-products can adversely affect the coloring of the polyester resins mentioned above, and can also be a cause of irritating odor from the toner. In particular, compounds with low boiling points such as acetaldehydes and propionaldehydes tend to be easily dispersed in the air upon heating during the melting and kneading of toner production, or during copying, thus resulting in irritating odors.

Therefore, it is important that the content of aldehyde compounds, their decomposition products and by-products in the polyester resin employed in the toner or in the toner itself be in a range of no greater than 200 ppm, preferably 100 ppm, more preferably no greater than 50 ppm, and even more preferably no greater than 10 ppm. This is because when aldehyde compounds, their decomposition products and by-products are present in the polyester resin or toner at greater than 200 ppm, they tend to adversely affect the coloring of the polyester resin and also create an irritating odor in the toner.

The toner polyester resin of the invention preferably has a light absorbance of no greater than 0.05 at a wavelength of 440 nm. This is because when the absorbance value is greater than 0.05 the light permeability is lowered making it impossible to obtain clear images when used as a full color toner binder resin for copying to OHP sheets, etc., while the tone reproduction is also lowered. The light absorbance at a wavelength of 440 nm is more preferably no greater than 0.03, and even more preferably no greater than 0.01.

The light absorbance according to the present invention is the value obtained by dissolving 2 g of the polyester resin in 100 ml of methyl chloride, and using a spectrophotometer to measure the absorbance at 440 nm.

The main possible cause of the adverse effect on the absorbance of the polyester resin is that of decomposition products generated during polymerization of the polyester resin, and therefore the absorbance may be lowered by appropriate selection of decomposition-resistant monomers and polymerization conditions which minimize production of decomposition products. Since it is particularly important to inhibit production of aldehyde compounds, their decomposition products and by-products in polyester resins, it is important that the content of aldehyde compounds, their decomposition products and by-products in polyester resins and toners be in a range of no greater than 200 ppm, preferably no greater than 100 ppm, and more preferably no greater than 50 ppm.

The method of obtaining a toner polyester resin according to the invention is not particularly limited, and it may be obtained, for example, by the following method.

(1) First, the polymerization components which are an acid component (a) and an alcohol component (b) are charged into a reactor, heated under a nitrogen air flow for esterification or transesterification, and then (2) the water or alcohol produced by the above reaction is removed by a common method, after which condensation reaction is accomplished under a low temperature of 240° C. or below and a high vacuum of 30 mmHg or lower, while distilling off the aldehyde compounds, their decomposition products and by-products, and the alcohol components.

The acid component (a) used to obtain the toner polyester resin of the invention is one which contains at least one selected from the group consisting of aromatic dicarboxylic acids such as terephthalic acid and isophthalic acid, and their lower alkyl esters.

Examples of lower alkyl esters of terephthalic acid and isophthalic acid to be used as the acid component (a) include dimethyl terephthalate, dimethyl isophthalate, diethyl terephthalate, diethyl isophthalate, dibutyl terephthalate, dibutyl isophthalate, etc., and from the viewpoint of cost and handling, dimethyl terephthalate and dimethyl isophthalate are preferred. The above-mentioned aromatic dicarboxylic acids and their lower alkyl esters may be used alone or in combinations of two or more.

The aromatic dicarboxylic acid, having a highly hydrophobic benzene ring, is able to both increase the moisture resistance of the toner and increase the glass transition temperature (hereunder referred to as "Tg") of the resultant resin, thus having an improving effect on the blocking resistance. Thus, the aromatic dicarboxylic acid is preferably present at 60 mole percent or greater, and more preferably 70 mole percent or greater, with respect to the total acid component. Since terephthalic acid compounds have an effect of increasing both the toughness and the Tg of the resin, they are preferably present in a range of 50 mole percent or greater, and more preferably 60 mole percent or greater, with respect to the total acid component. Isophthalic acid compounds, which have an effect of increasing the reactivity, are preferably used in different usage proportions depending on the desired object.

Other examples of dicarboxylic acids which may if necessary be used as the acid component (a) according to the present invention include phthalic acid, sebacic acid, isodecylsuccinic acid, maleic acid, fumaric acid, adipic acid, and their monomethyl, monoethyl, dimethyl and diethyl esters, as well as their acid anhydrides. Since these divalent carboxylic acid components have a notable effect on the fixing property and blocking resistance of the toner, they should be added within a range which does not hinder the object of the invention, preferably about 30 mole percent or less with respect to the total acid component, depending on the performance demanded of the resin.

According to the present invention, the acid component (a) used may also if necessary be a trivalent or higher polyvalent carboxylic acid. Examples of trivalent or higher polyvalent carboxylic acids include trimellitic acid, pyromellitic acid, 1,2,4-cyclohexanetricarboxylic acid, 2,5,7-naphthalenetricarboxylic acid, 1,2,4-naphthalenetricarboxylic acid, 1,2,5-hexanetricarboxylic acid, 1,2,7,8-octanetetracarboxylic acid and their acid anhydrides.

These trivalent or higher polyvalent carboxylic acids may be used either alone or in combinations of 2 or more, and for the effect of increasing the Tg of the resultant resin and the effect of imparting cohesiveness to the resin to increase the non-offsetting property of the toner, they are preferably used in a range of 0.5 to 30 mole percent, and more preferably 1 to 25 mole percent, with respect to the total acid component. This is because the above-mentioned effect cannot be adequately achieved at less than 0.5 mole percent, and control of gelation during production of the polyester resin becomes difficult at greater than 30 mole percent, which complicates efforts to obtain the desired resin. When the trihydric or higher polyhydric alcohols mentioned below are used in combination, the total amount of both is preferably within the range specified above.

The alcohol component (b) used to obtain the toner polyester resin of the present invention contains an aromatic diol comprising a bisphenol A derivative. Although aromatic diols comprising bisphenol A derivatives result in production of aldehyde compounds, etc., because of their effect of raising the Tg of the resin and improving the blocking resistance of the toner, they may be suitably used as alcohol components for the toner polyester resin.

Examples of aromatic diols which may be used according to the invention are the bisphenol A derivatives polyoxyethylene-(2.0)-2,2-bis(4-hydroxyphenyl)propane, polyoxypropylene-(2.0)-2,2-bis(4 -hydroxyphenyl)propane, polyoxypropylene-(2.2)-polyoxyethylene-(2.0)-2,2-bis(4-hydroxyphenyl)propane, polyoxyethylene-(2.3)-2,2-bis(4-hydroxyphenyl)propane, polyoxypropylene-(6)-2,2-bis(4-hydroxyphenyl)propane, polyoxypropylene-(2.3)-2,2-bis(4-hydroxyphenyl)propane, polyoxypropylene-(2.4)-2,2-bis(4-hydroxyphenyl)propane, polyoxypropylene-(3.3)-2,2-bis(4-hydroxyphenyl)propane, polyoxyethylene-(3.0)-2,2-bis(4-hydroxyphenyl)propane, polyoxyethylene-(6)-2,2-bis(4-hydroxyphenyl)propane, etc.

These aromatic diols may be used either alone or in mixtures of 2 or more. However, since aromatic diols have low reactivity and promote decomposition, they are a cause of generation of aldehyde compounds, their decomposition pros and by-products, and therefore must be used in limited amounts in consideration of coloration of the resin and the resulting adverse influence on its absorbance. They are preferably used in an amount of no more than 90 mole percent, and more preferably no more than 80 mole percent, with respect to the total acid component. Nevertheless, since the aromatic diol has an effect of raising the Tg and improving the blocking resistance of the toner, it is preferably used in an amount of at least 20 mole percent with respect to the total acid component, although the amount must be set for the most favorable balance against coloration of the polyester resin.

According to the present invention, the alcohol component (b) contains an appropriate amount of an aliphatic diol. Examples of useful aliphatic diols include ethylene glycol, diethylene glycol, neopentyl glycol, propylene glycol, butanediol, etc., which may be used alone or in combinations of 2 or more. These aliphatic diols have the effect of improving the condensation polymerization reaction rate. Of these, ethylene glycol, neopentyl glycol and butanediol are preferred from the standpoint of the fixing property.

Aliphatic diols impart pliability to the resin and contribute to the fixing property, but because they also lower the Tg and have an adverse effect on the blocking resistance, they are preferably used in amounts appropriately set depending on the type of machine in which the toner is to be used. The amount of the aliphatic diol is preferably in a range of between 20 and 80 mole percent, and more preferably between 40 and 80 mole percent, with respect to the total acid portion.

Furthermore, the alcohol component (b) according to the present invention may be, if necessary, a trihydric or higher polyhydric alcohol. Examples of polyhydric alcohols include sorbitol, 1,2,3,6-hexanetetrol, 1,4-sorbitan, pentaerythritol, dipentaerythritol, tripentaerythritol, sucrose, 1,2,4-butanetriol, 1,2,5-pentanetriol, glycerol, 2-methylpropanetriol, 2-methyl-1,2,4-butanetriol, trimethylolethane, trimethylolpropane, 1,3,5-trihydroxymethylbenzene, etc. These polyhydric alcohols may be used alone or in combinations of 2 or more. These trihydric and higher polyhydric alcohols have an effect of increasing the Tg of the resultant resin, while imparting cohesiveness to the resin and increasing the non-offsetting property of the toner. They are preferably used in amounts within the range of 0.5 to 50 mole percent, and more preferably 1 to 25 mole percent, with respect to the total acid component. This is because at less than 0.5 mole percent the above-mentioned effect is not adequately achieved, and at greater than 30 mole percent it becomes difficult to control gelation of the polyester resin during production, complicating efforts to obtain the desired resin. When the above-mentioned trihydric or higher polyhydric alcohols are used in combination, their total amount is preferably within the ranges specified above.

The toner polyester resin of the present invention may be obtained by polymerization of the aforementioned acid component (a) and alcohol component (b), but in order to achieve the object of the invention it is essential to employ a polymerization process which minimizes generation of decomposition products which adversely affect coloration of the polyester resin and can become a cause of irritating odors in the toner.

According to the invention, the aforementioned monomers are charged into a reactor and heated for esterification or transesterification. At this time there is also used, if necessary, a publicly known esterification catalyst or transesterification catalyst commonly used for esterification or transesterification reactions, such as titanium butoxide, dibutyltin oxide, magnesium acetate or manganese acetate. Next, the water or alcohol produced during the reaction is removed according to a common method. For the polymerization, a common, publicly known polymerization catalyst such as titanium butoxide, dibutyltin oxide, tin acetate, zinc acetate, tin disulfide, antimony trioxide, germanium dioxide, etc., is used.

According to the present invention this is followed by the polymerization reaction, which may be conducted under a vacuum of 100 mmHg or lower while distilling off the diol components. The esterification reaction, which is the first step of the polymerization process, is preferably conducted under a nitrogen gas flow. The condensation reaction, which is the second step, is preferably conducted at a low temperature of 240° C. or lower and a high vacuum of 30 mmHg or lower. When the condensation is carried out at a high temperature of over 240° C. there is extreme generation of aldehyde decomposition products, etc., and resins obtained thereby generate considerable irritating odors when made into toners, and lower the light permeability when copying is performed with OHP. The temperature for the condensation reaction is more preferably no higher than 230° C., and even more preferably no higher than 220° C. Also, the high vacuum for the reaction not only increases the reaction rate, but has the additional effect of removing the generated low-boiling-point aldehyde compounds from the system. The condensation reaction is more preferably conducted under a vacuum of 10 mmHg or lower, and even more preferably 5 mmHg or lower.

The toner polyester resin of the invention which is obtained in this manner has a content of aldehyde compounds, their decomposition products and by-products of 200 ppm or lower, is free of coloration, and also has low light absorbance (at 400 nm), while it does not emanate irritating odors even upon melting and kneading during the toner production or upon heating during the copying process; thus, it is suitable as a binder resin for full color toner with which tinting of toner images is a particularly noted problem.

According to the present invention, toner using a binder resin whose main component is a polyester resin with a content of aldehyde compounds, their decomposition products and by-products of 200 ppm or less, has lower generation of irritating odors of the toner due to aldehyde compounds, their decomposition products and by-products in the toner. Although the content of aldehyde compounds, their decomposition products and by-products in the toner is preferably 200 ppm or less, it is more preferably in the range of 100 ppm or less, and even more preferably 50 ppm or less.

Furthermore, since the polyester resin of the invention is a resin with high light permeability and excellent color tone, having an absorbance of 0.5 or lower at a wavelength of 440 nm, when it is used as a binder resin for full color toner it is possible to avoid reduction in image precision of copied print. Especially when the resin is used as a full color toner binder resin for copying to OHP sheets, etc., it becomes possible to obtain clear images without haziness of the images due to lowered permeability of the copy material, while the range of tone reproduction is also widened, to thus provide superior image precision for copied print.

According to the invention, this type of polyester resin is used as the main component of a toner binder resin, but the binder resin may also include if necessary other resins such as styrene-based resins and styrene-acrylic reins.

The toner of the invention contains a binder resin whose main component is the polyester resin described above, and also a coloring agent, with the binder resin preferably present in the toner within a range of 70 to 97 wt %, and more preferably a range of 80 to 95 wt %. This is because a binder resin content of less than 70 wt % tends to reduce the non-offsetting property of the toner, while a content exceeding 97 wt % tends to impair the electrostatic stability of the toner. Any common coloring agent may be used, examples of which are coloring agents and pigments such as carbon black, nigrosine dye, lamp black, Sudan black SM, navel yellow, mineral fast yellow, lithol red, permanent orange 4R, etc.

The toner of the invention may also include additives such as charge controllers, anti-offsetting agents, magnetic powders, etc. Such additives may be commonly used ones, examples of which include charge controllers such as nigrosine, alkyl-containing azine-based dyes, basic dyes, monoazo dyes and metal complexes thereof, salicylic acid and metal complexes thereof, alkylsalicyclic acids and metal complexes thereof, naphthoic acid and metal complexes thereof, etc.; anti-offsetting agents such as polyethylene, polypropylene, ethylene-polypropylene copolymer, etc.; magnetic powders such as ferrite, magnetite, etc., and the like.

The toner of the invention is prepared by using a kneading machine such as a twin-screw extruder or mixer to knead the binder resin, coloring agent and additives at a temperature about 15° to 30° C. higher than the softening temperature of the binder resin, and then finely crushing and sorting the product. The resultant toner grains have an average grain size of preferably about 5–20 μm, and more preferably about 8–15 μm. Fine grains with a grain size of 5 μm or less preferably account for less than 3 wt % of the entirety.

The present invention is explained in more detail below by way of examples and comparative examples.

The performance evaluations in the examples and comparative examples were made according to the following methods.

(1) Tg (glass transition temperature) (°C.)

A differential scanning calorimeter, product of Shimazu Laboratories, was used for measurement of the melt quenched sample at a temperature elevation of 5° C./min. The Tg was taken as the intersection (shoulder value) between the baseline near the endothermic curve and the tangent.

(2) Softening temperature (°C.)

A flow tester (CFT-500), product of Shimazu Laboratories, was used for measurement of the softening temperature (°C.) as the temperature at which half of a 1.0 g sample flowed out under conditions of a 1.0 mmΦ×10 mml nozzle, 30 kgf load and a 3° C./min temperature elevation.

(3) Compositional analysis

The resin was hydrolyzed with hydrazine and quantitatively analyzed by liquid chromatography.

(4) Acid value (mgKOH/g)

The resin thermally dissolved in benzyl alcohol and then cooled and titrated with a 1/50N KOH benzyl alcohol solution.

(5) Content of aldehyde compounds, their decomposition products and by-products

A 2.0 g sample was quantitatively analyzed by headspace gas chromatography (HSS-2B, product of Shimazu Laboratories, KK.)

(6) Organoleptic test

A 10 g sample was placed in a reinforced glass sample bottle and heated at 150° C. for 30 minutes, after which the presence of odors was noted.

o: Some irritating odor x: No irritating odor (7) Absorbance

A 2 g portion of the resin was dissolved in 100 ml of methylene chloride, and the absorbance at a wavelength of 440 nm was measured with a spectrophotometer (Model 150-20, product of Hitachi Laboratories, KK.) using a standard quartz cell with an optical length of 10 mmL.

(8) Toner image evaluation

A full color copier was used, having a heat roller coated with silicone oil, a freely variable temperature, and a printing speed of 7 pages/min, and the image haziness and image precision of copying onto OHP film were visually evaluated according to the following criteria.

⊚: Very clear with no image haziness, and excellent image precision o: Clear with almost no image haziness, and satisfactory image precision x: Conspicuous image haziness and poor image precision The abbreviations used in the examples and comparative examples stand for the following.

Diol A: polyoxypropylene-(2.3)-2,2-bis(4-hydroxyphenyl)propane

Diol B: polyoxyethylene-(2.3)-2,2-bis(4-hydroxyphenyl)propane

EXAMPLE 1

One hundred molar parts of terephthalic acid, 50 molar parts of diol A, 10 molar parts of diol B and 55 molar parts of ethylene glycol were charged into a reactor equipped with a distillation column. An antimony trioxide catalyst was added at 0.05 parts by weight to the total acid component, and esterification reaction was conducted under a nitrogen flow at ordinary pressure, maintaining an inner temperature of 260° C. and an agitating rotational speed of 120 rpm. The pressure of the reaction system was then lowered to 1.0 mmHg over a period of 30 minutes, and upon condensation reaction for 5 hours while maintaining an inner temperature of 220° C. to distill off the ethylene glycol, there was obtained resin R-1 with characteristic values of a Tg of 62° C., a softening temperature of 180° C. and an acid value of 9.3 mgKOH/g. Table 1 lists the results of the compositional analysis, quantitative analysis of the aldehyde compound content and organoleptic test for the obtained resin R-1.

Next, 4 parts by weight of carbon black (#40, product of Mitsubishi Chemicals, KK.) and 1 part by weight of a charge controller (Bontron S-34, product of Orient Chemicals, KK.) were premixed with 94 parts by weight of the above-mentioned resin R-1. An internal mixer (product of Kurimoto Tekko, KK.) was then used for 30 minutes' kneading at 65 rpm with an internal temperature of 150° C. The resultant kneaded mixture was coarsely crushed, and then finely crushed and sorted into toner having a grain size of 5–18 μm.

The resultant toner was subjected to quantitative analysis of the aldehyde compound content and organoleptic testing. The results are shown in Table 1.

COMPARATIVE EXAMPLE 1

Esterification and condensation were performed with the same charged composition and procedure for polymerization as in Example 1, to obtain resin R-2. However, during the esterification no nitrogen was introduced, and the condensation was conducted at a temperature of 270° C. and a vacuum of 100 mmHg for 6 hours.

The resultant resin R-2 had a Tg of 64° C. and a softening temperature of 110° C. When the aldehyde compound content of resin R-2 was measured, it was found to contain 350 ppm propionaldehyde. Also, a very strong irritating odor was noted in the organoleptic test.

When toner prepared using this resin R-2 by the same method as in Example 1 was quantitatively analyzed for aldehyde compound content, it was found to contain 320 ppm propionaldehyde. Also, a strong irritating odor was noted in the organoleptic test.

When a twin-screw extruder with vent holes was used for the kneading described above, the propionaldehyde content of the toner was reduced to 220 ppm, but an irritating odor was still noted in the organoleptic test.

EXAMPLES 2–7

The same procedure as in Example 1 was followed, except that the esterification atmosphere, condensation conditions and resin composition were changed as shown in Table 1, to obtain resins R-3 to R-8.

The resultant resins R-3 to R-8 and toners prepared by the method in Example 1 using these resins R-3 to R-8 were subjected to quantitative analysis of aldehyde compounds and organoleptic testing. The results are given in Table 1.

All of the resins R-3 to R-8 had low aldehyde compound contents and no irritating odor in the organoleptic test. Their toners also had low aldehyde compound contents and no irritating odor in the organoleptic test.

COMPARATIVE EXAMPLES 2–5

The same procedure as in Example 1 was followed, except that the esterification atmosphere, condensation conditions and resin composition were changed as shown in Table 1, to obtain resins R-9 to R-12.

The resultant resins R-9 to R-12 and toners prepared by the method in Example 1 using these resins R-9 to R-12 were subjected to quantitative analysis of aldehyde compounds and organoleptic testing. The results are given in Table 1.

All of the resins R-9 to R-12 had high aldehyde compound contents and also irritating odors in the organoleptic test. Their toners also had high aldehyde compound contents and irritating odors in the organoleptic test.

EXAMPLES 8–9

The same procedure as in Example 1 was followed, except that the esterification atmosphere, condensation conditions and resin composition were changed as shown in Table 1, to obtain resins R-13 to R-14.

The resultant crosslinked resins R-13 to R-14 and toners prepared by the method in Example 1 using these resins R-13 to R-14 were subjected to quantitative analysis of aldehyde compounds and organoleptic testing. The results are given in Table 1.

All of the crosslinked resins R-13 to R-14 had low aldehyde compound contents and no irritating odor in the organoleptic test. Their toners also had low aldehyde compound contents and no irritating odor in the organoleptic test.

|  | Ex. 1 R-1 | Comp. Ex. 1 R-2 | Ex. 2 R-3 | Ex. 3 R-4 | Ex. 4 R-5 | Ex. 5 R-6 | Ex. 6 R-7 | Ex. 7 R-8 |
|---|---|---|---|---|---|---|---|---|
| TPA | 100.0 | 100.0 | 100.0 | 100.0 | 100.0 | 100.0 | 50.3 | 41.1 |
| IPA |  |  |  |  |  |  | 49.7 | 58.9 |
| TMA |  |  |  |  |  |  |  |  |
| Diol A | 49.4 | 49.4 | 40.2 | 30.1 | 89.0 | 67.7 | 30.0 | 29.8 |
| Diol B | 9.8 | 9.8 | 29.8 | 30.3 |  |  | 50.3 | 29.9 |
| Aromatic subtotal | 59.2 | 59.2 | 70.0 | 60.4 | 89.0 | 67.7 | 80.3 | 59.7 |
| NPG |  |  |  |  |  |  |  |  |
| EG | 41.7 | 41.7 | 31.2 | 42.1 | 13.1 | 34.3 | 21.3 | 42.2 |
| Aliphatic subtotal | 41.7 | 41.7 | 31.2 | 42.1 | 13.1 | 34.3 | 21.3 | 42.2 |
| Nitrogen air flow | ○ | X | ○ | ○ | ○ | ○ | ○ | ○ |
| Polymerization temperature | 220 | 270 | 200 | 180 | 230 | 240 | 220 | 220 |
| Vacuum degree | 1 | 100 | 1 | 1 | 1 | 30 | 3 | 3 |
| Polymerization time | 5 | 6 | 6 | 4 | 6 | 3 | 5 | 2 |
| Aldehyde[*1)] | 5 | 350 | 5 | 3 | 23 | 140 | 4 | 6 |
| Organoleptic test | ○ | X | ○ | ○ | ○ | ○ | ○ | ○ |

-continued

| | | | | | | | |
|---|---|---|---|---|---|---|---|
| Toner aldehyde*[2] | 7 | 320 | 3 | 3 | 18 | 135 | 5 | 8 |
| Toner organoleptic test | ○ | X | ○ | ○ | ○ | ○ | ○ | ○ |

| | Comp. Ex. 2 R-9 | Comp. Ex. 3 R-10 | Comp. Ex. 4 R-11 | Comp. Ex. 5 R-12 | Ex. 8 R-13 | Ex. 9 R-14 |
|---|---|---|---|---|---|---|
| TPA | 100.0 | 100.0 | 50.1 | 40.2 | 56.1 | 90.2 |
| IPA | | | | | 30.1 | |
| TMA | | | | | 13.8 | 9.8 |
| Diol A | 91.2 | 50.2 | 39.9 | 40.1 | 50.1 | 50.3 |
| Diol B | | 10.1 | 21.0 | 40.1 | | |
| Aromatic subtotal | 91.2 | 60.3 | 60.9 | 80.2 | 50.1 | 50.3 |
| NPG | | | 20.1 | | | |
| EG | 11.2 | 40.7 | 21.0 | 22.1 | 51.1 | 51.1 |
| Aliphatic subtotal | 11.2 | 40.7 | 41.1 | 22.1 | 51.1 | 51.1 |
| Nitrogen air flow | X | X | X | X | ○ | ○ |
| Polymerization temperature | 260 | 280 | 270 | 280 | 240 | 220 |
| Vacuum degree | 50 | 760 | 30 | 100 | 1 | 1 |
| Polymerization time | 8 | 12 | 5 | 6 | 2.5 | 4 |
| Aldehyde*[1] | 340 | 450 | 310 | 310 | 38 | 58 |
| Organoleptic test | X | X | X | X | ○ | ○ |
| Toner aldehyde*[2] | 320 | 440 | 310 | 295 | 30 | 62 |
| Toner organoleptic test | X | X | X | X | ○ | ○ |

TPA: terephthalic acid  IPA: isophthalic acid  TMA: trimellitic anhydride  NPG: neopentyl glycol
EG: ethylene glycol
*[1] aldehyde compound (propionaldehyde) content (ppm)
*[2] aldehyde compound (propionaldehyde) content (ppm) of prepared toner

EXAMPLE 10

One hundred molar parts of terephthalic acid, 60 molar parts of diol A and 65 molar parts of ethylene glycol were charged into a reactor equipped with a distillation column. An antimony trioxide catalyst was added at 0.05 parts by weight to the total acid component, and esterification reaction was conducted under a nitrogen flow at ordinary pressure, maintaining an inner temperature of 260° C. and an agitating rotational speed of 120 rpm. The pressure of the reaction system was then lowered to 1.0 mmHg over a period of 30 minutes, and upon condensation reaction for 5 hours while maintaining an inner temperature of 220° C. to distill off the ethylene glycol, there was obtained resin R-15 with characteristic values of a Tg of 64° C., a softening temperature of 109° C. and an acid value of 7.1 mgKOH/g. Table 2 lists the results of the compositional analysis, quantitative analysis of the aldehyde compound content, organoleptic test and absorbance measurement for the obtained resin R-15.

Next, 5 parts by weight of carbon black (#40, product of Mitsubishi Chemicals, KK.) and 1 part by weight of a charge controller (Bontron S-34, product of Orient Chemicals, KK.) were premixed with 94 parts by weight of the above-mentioned resin R-15. An internal mixer (product of Kurimoto Tekko, KK.) was then used for 30 minutes' kneading at 65 rpm with an internal temperature of 150° C. The resultant kneaded mixture was coarsely crushed, and then finely crushed and sorted into toner having a grain size of 5–18 μm.

The resultant toner was subjected to quantitative analysis of the aldehyde compound content and organoleptic testing. The results are shown in Table 2.

COMPARATIVE EXAMPLE 6

Esterification and condensation were performed with the same charged composition and procedure for polymerization as in Example 10, to obtain resin R-16. However, during the esterification no nitrogen was introduced, and the condensation was conducted at a temperature of 270° C. and a vacuum of 100 mmHg for 7 hours.

The resultant resin R-16 had a Tg of 63° C. and a softening temperature of 106° C. When the aldehyde compound content of resin R-16 was measured, it was found to contain 330 ppm propionaldehyde and 40 ppm 2-ethyl-1,3-dioxolane, and a very strong irritating odor was also noted in the organoleptic test. The absorbance indicating coloration was 0.076.

When toner prepared using this resin R-16 by the same method as in Example 10 was quantitatively analyzed for aldehyde compound content, it was found to contain 315 ppm propionaldehyde and 37 ppm 2-ethyl-1,3-dioxolane, and a strong irritating odor was also noted in the organoleptic test.

When a twin-screw extruder with vent holes was used for the kneading described above, the propionaldehyde content of the toner was reduced to 220 ppm, but an irritating odor was still noted in the organoleptic test.

EXAMPLES 11–14

The same procedure as in Example 10 was followed, except that the esterification atmosphere, condensation conditions and resin composition were changed as shown in Table 2, to obtain resins R-17 to R-20. Table 2 also lists the results of the compositional analysis, quantitative analysis of the aldehyde compound content, organoleptic test and absorbance measurement for the obtained resins.

These resins R-17 to R-20 were then used to prepare full color toners in the same manner as in Example 10, except that a full color toner coloring agent was used. Table 2 also shows the results of quantitative analysis of aldehyde compounds, organoleptic test, absorbance measurement and image evaluation for the obtained toners.

All of the resins R-17 to R-20 had low absorbance at a wavelength of 440 nm, and exhibited excellent image properties when made into toner. Resins R-19 and R-20 in particular had very excellent image properties. Also, all of the resins R-17 to R-20 had low aldehyde compound contents and no irritating odor in the organoleptic test. Their toners also had no irritating odor in the organoleptic test.

COMPARATIVE EXAMPLES 7–10

The same procedure as in Example 10 was followed, except that the esterification atmosphere, condensation conditions and resin composition were changed as shown in Table 2, to obtain resins R-21 to R-24. Table 2 also lists the results of the compositional analysis, quantitative analysis of the aldehyde compound content, organoleptic test and absorbance measurement for the obtained resins.

These resins R-21 to R-24 were then used to prepare full color toners in the same manner as in Example 10, except that a full color toner coloring agent was used. Table 2 also shows the results of quantitative analysis of the aldehyde compound content, organoleptic test and image evaluation for the obtained toners.

All of the resins R-21 to R-24 had high absorbance at a wavelength of 440 nm, thus exhibiting poor light permeability, and also gave hazy images with poor image precision when made into toner. Also, all of the resins had high aldehyde compound contents and irritating odors in the organoleptic test, and their toners also had irritating odors.

TABLE 2

|  | Ex. 10 R-15 | Comp. Ex. 6 R-16 | Ex. 11 R-17 | Ex. 12 R-18 | Ex. 13 R-19 |
|---|---|---|---|---|---|
| TPA | 100.0 | 100.0 | 100.0 | 100.0 | 50.2 |
| IPA |  |  |  |  | 49.8 |
| TMA |  |  |  |  |  |
| Diol A | 59.8 | 59.8 | 21.6 | 72.5 | 40.3 |
| Diol B |  |  | 30.3 |  | 41.1 |
| Aromatic subtotal | 59.8 | 59.8 | 51.9 | 72.5 | 81.4 |
| NPG |  |  |  |  |  |
| EG | 48.1 | 48.1 | 55.5 | 38.6 | 33.3 |
| Aliphatic subtotal | 48.1 | 48.1 | 55.5 | 38.6 | 33.3 |
| Nitrogen air flow | o | x | o | o | o |
| Polymerization temperature | 220 | 270 | 230 | 220 | 200 |
| Vacuum degree | 1 | 100 | 1 | 1 | 30 |
| Polymerization time | 5 | 7 | 3 | 5 | 5 |
| Aldehyde*1) | 11 | 330 | 16 | 25 | 6 |
| Organoleptic test | o | x | o | o | o |
| Absorbance (440 nm) | 0.007 | 0.07 | 0.012 | 0.019 | 0.009 |
| Toner aldehyde*2) | 10 | 300 | 15 | 22 | 4 |
| Toner organoleptic test | o | x | o | o | o |
| Toner image evaluation | ⊙ | x | o | o | ⊙ |

|  | Ex. 14 R-20 | Comp. Ex. 7 R-21 | Comp. Ex. 8 R-22 | Comp. Ex. 9 R-23 | Comp. Ex. 10 R-24 |
|---|---|---|---|---|---|
| TPA | 49.9 | 100.0 | 100.0 | 80.2 | 60.2 |
| IPA | 50.1 |  |  | 19.8 | 39.8 |
| TMA |  |  |  |  |  |
| Diol A | 20.3 | 90.0 | 49.5 | 39.9 | 40.1 |
| Diol B | 50.2 |  | 10.3 | 19.2 | 40.1 |
| Aromatic subtotal | 70.5 | 90.0 | 59.8 | 59.1 | 80.2 |
| NPG |  |  |  | 22.1 |  |
| EG | 44.2 | 21.9 | 50.4 | 41.0 | 32.1 |
| Aliphatic subtotal | 44.2 | 21.9 | 50.4 | 63.1 | 32.1 |
| Nitrogen air flow | o | x | x | x | x |
| Polymerization temperature | 180 | 270 | 280 | 250 | 280 |

TABLE 2-continued

| Vacuum degree | 3 | 50 | 760 | 30 | 100 |
|---|---|---|---|---|---|
| Polymerization time | 4 | 8 | 12 | 5 | 6 |
| Aldehyde*1) | 4 | 340 | 450 | 210 | 310 |
| Organoleptic test | o | x | x | x | x |
| Absorbance (440 nm) | 0.002 | 0.073 | 0.061 | 0.034 | 0.025 |
| Toner aldehyde*2) | 2 | 320 | 410 | 205 | 280 |
| Toner organoleptic test | o | x | x | x | x |
| Toner image evaluation | ⊙ | x | x | o | o |

TPA: terephthalic acid
IPA: isophthalic acid.
TMA: trimellitic anhydride
NPG: neopentyl glycol
EG: ethylene glycol
*1: aldehyde compound (propionaldehyde) content (ppm)
*2: aldehyde compound (propionaldehyde) content (ppm) of prepared toner

INDUSTRIAL APPLICABILITY

The toner polyester resin according to the present invention has low light absorbance and excellent light permeability and color tone, and when made into toner it provides excellent image clarity and image precision, making it particularly suitable for full color toner with which tinting of toner images is a problem. In addition, the polyester resin and toner according to the invention does not emanate irritating odors even upon melting and kneading during the toner production or upon heating during the copying process, and is therefore very useful as dry toner resin and toner to be used for electrostatic charged images or magnetic latent images by electrophotography, electrostatic recording, electrostatic printing, and the like.

We claim:

1. A toner comprising a binder resin and a coloring agent, wherein a polyester resin is the main component of the binder resin, and the content of aldehyde compounds, their decomposition products and by-products in the toner is no more than 200 ppm.

2. Toner according to claim 1 wherein the content of aldehyde compounds, their decomposition products and by-products is no more than 100 ppm.

3. Toner according to claim 1 wherein the content of aldehyde compounds, their decomposition products and by-products is no more than 50 ppm.

4. Toner according to claim 1 wherein the content of aldehyde compounds, their decomposition products and by-products is no more than 10 ppm.

5. Toner according to claim 1 wherein the aldehyde compounds, their decomposition products and by-products have a boiling point of 180° C. or lower.

6. Toner according to claim 1 wherein the aldehyde compounds, their decomposition products and by-products have a boiling point of 100° C. or lower.

7. Toner according to claim 1 wherein the aldehyde compounds, their decomposition products and by-products have a boiling point of 50° C. or lower.

8. Toner according to claim 1 wherein the aldehyde compounds, their decomposition products or by-products are propionaldehyde, acetaldehyde or dioxolane compounds.

9. The toner of claim 1, wherein the coloring agent is a pigment.

10. The toner of claim 9, wherein the pigment is selected from the group consisting of carbon black, nigrosine dye, lamp black, Sudan black SM, navel yellow, mineral fast yellow, lithol red and permanent orange 4R.

11. The toner of claim 1, comprising 70 to 97% by weight of the binder resin.

12. The toner of claim 1, wherein the polyester resin is comprised of an polymerized alcohol component which contains at least one bisphenol A derivative diol.

13. The toner of claim 12, wherein the bisphenol A derivative diol is an alkylene oxide addition product of bisphenol A.

14. The toner of claim 12, wherein the bisphenol A derivative diol is an ethylene oxide or propylene oxide addition product of bisphenol A.

15. A method of making a toner image comprising applying the toner of claim 1 to a substrate.

16. The method of claim 15, wherein the substrate is a paper or an overhead projection film.

17. The method of claim 15, wherein the toner is applied to the substrate by electrophotography, electrostatic recording or electrostatic printing.

* * * * *